(12) United States Patent
Brown (10) Patent No.: US 9,675,058 B2
(45) Date of Patent: Jun. 13, 2017

(54) FISH RECOMPRESSION TOOL

(76) Inventor: Bill D. Brown, Miami, FL (US)

( * ) Notice: Subject to any disclaimer, the term of this patent is extended or adjusted under 35 U.S.C. 154(b) by 1267 days.

(21) Appl. No.: 13/475,635

(22) Filed: May 18, 2012

(65) Prior Publication Data
US 2012/0291713 A1 Nov. 22, 2012

Related U.S. Application Data

(60) Provisional application No. 61/487,764, filed on May 19, 2011.

(51) Int. Cl.
*A01K 97/00* (2006.01)
*A01K 97/14* (2006.01)
*B63B 22/14* (2006.01)

(52) U.S. Cl.
CPC .............. *A01K 97/14* (2013.01); *A01K 97/00* (2013.01); *B63B 22/14* (2013.01)

(58) Field of Classification Search
CPC ........ A01K 91/00; A01K 97/11; A01K 93/02; A01K 97/24; A01K 91/04; A01K 85/00; A01K 97/00; A01K 97/14; A01M 23/26; A01M 23/24; A01M 23/245; A01M 21/00; B63C 9/22; B63B 22/14; B64D 17/386
USPC ..... 43/15, 17.2, 95, 96, 4.5, 4, 43.12, 1, 25; 119/201; 441/2, 6, 7, 10; 114/367
See application file for complete search history.

(56) References Cited

U.S. PATENT DOCUMENTS

| | | | | | |
|---|---|---|---|---|---|
| 2,839,767 | A | * | 6/1958 | Sieverts | B63C 9/22 114/367 |
| 5,438,949 | A | * | 8/1995 | Day | B63B 22/14 441/10 |
| 5,855,450 | A | * | 1/1999 | Richard | B63C 9/22 114/378 |
| 6,092,327 | A | * | 7/2000 | Nymann | A01K 97/02 43/42.06 |
| 6,421,949 | B1 | * | 7/2002 | Schytte | A01K 91/06 43/43.12 |
| 8,002,599 | B2 | * | 8/2011 | Grabe | B63B 22/003 441/10 |
| 8,806,800 | B2 | * | 8/2014 | Hupp | A01K 97/00 43/4 |
| 2016/0113256 | A1 | * | 4/2016 | Van Heiningen | A01K 97/02 43/4.5 |

* cited by examiner

*Primary Examiner* — Marc Burgess
(74) *Attorney, Agent, or Firm* — Robert M. Downey, P.A.

(57) ABSTRACT

A fish recompression tool comprises an elongate body having and internal airtight chamber, an attachment member, a locking member, a piston, and a spring within the airtight chamber that engages the piston. The attachment member may switch between open and closed configurations, such that a fish is attached to the device in the closed configuration. The attachment member configuration is controlled by the locking member, such that a locked configuration corresponds to a closed configuration. The attachment member switches to the open configuration when the piston moves in response to reaching a water depth that results in the external pressure surrounding the airtight chamber being sufficiently greater than the internal pressure within the airtight chamber and the spring force on the piston. In preferred embodiments, a plug attaches to an open ended elongate body and may be moved to set different unlocking requirements (i.e. different release depths).

18 Claims, 11 Drawing Sheets

FISH RECOMPRESSION TOOL

This non-provisional patent application is based on provisional patent application Ser. No. 61/487,764 filed on May 19, 2011.

BACKGROUND OF THE INVENTION

Field of the Invention

The present invention relates to deep water fishing and, more particularly, to a device that will safely return fish to their natural deep water habitat after their air bladder has inflated from being reeled to the surface.

Discussion of the Related Art

Catching fish in deep water, 50 ft. or more, is common in coastal areas and large lakes. Quite often, fish that are undersized, out of season, or non-targeted are caught unintentionally and then discarded. When brought up from the deep, these fish often have inflated air bladders and are unable to return to depth on their own. After they are released, they can be seen floating away either upside down or laying on their side struggling to return to their deep water habitats. For the most part, inflated fish either die, or are eaten by predators as they struggle on the surface. The damage to fisheries and aquatic ecosystems of the world is extensive and the loss of fish due to this cause further depletes an already exploited resource.

Fish saving devices such as: venting tools that piece a fish's abdomen or bladder to bleed off air, or clamps and weights that are used to return fish to deep water by weighing them down and then releasing them when the weights impact the bottom, are available today. Each has drawbacks. Piercing the belly of a fish, to bleed off air, can cause infection or damage organs that can significantly affect the survival of the fish. Raising and lowering weights is both time consuming and exhausting to the average fisherman who is unlikely to devote the time required to accomplish this task.

Research has shown that fish caught in several hundred feet of water only need to be returned to a depth of between 50 to 100 feet in order to shrink the air bladder sufficiently enough for the fish to swim away, under its own power, and survive. Accordingly, there is a need for a reliable Fish Recompression Device that is low cost, easy and quick to use.

In an effort to help reverse the devastation of fish populations from all causes, regulatory agencies and environmentalists are uniting to enact policies and regulations designed to protect this important resource. By closing territories and regulating fishing seasons, fish are protected but the economy suffers. Local and state revenues are negatively impacted due to lower sales of fishing licenses, tackle, and boats, as well as reduced tourism dollars in general. Regulations are also being considered that will require fishing boats to keep a Fish Recompression Device onboard.

While certain aspects of conventional technologies have been discussed and presented to facilitate disclosure of some embodiments, Applicants in no way disclaim these technical aspects, and it is contemplated that the attached claims may encompass one or more of the conventional technical aspects discussed herein.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is it known to be relevant to an attempt to solve any problem with which this specification is concerned.

SUMMARY OF THE INVENTION

Some embodiments may address one or more of the problems and deficiencies discussed above. However, it is contemplated that some embodiments may prove useful in addressing other problems and deficiencies in a number of technical areas. Therefore the claims should not necessarily be construed as limited to addressing any of the particular problems or deficiencies discussed herein.

Some embodiments may include a fish recompression device that comprises an elongate body having and internal airtight chamber, an attachment member, a locking member, a piston, and a spring within the airtight chamber that engages the piston. The attachment member may switch between open and closed configurations, such that a fish is attached to the device in the closed configuration. The attachment member configuration is controlled by the locking member, such that a locked configuration corresponds to a closed configuration. The attachment member switches to the open configuration when the piston moves in response to reaching a water depth that results in the external pressure surrounding the airtight chamber being sufficiently greater than the internal pressure within the airtight chamber and the spring force on the piston. In preferred embodiments, a plug attaches to an open ended elongate body and may be moved to set different unlocking requirements (i.e. different release depths).

An advantage provided by certain embodiments is that the device may be attached to a fish by a single fisherman, secure the fish such that it can be returned to deeper water, open automatically at a targeted depth. The device may have several configurations that allow for the selection of different depths. The device can be reused and more than one device, each securing a fish, can be returned to the depths simultaneously.

These and other advantages of some embodiments are more readily apparent with reference to the detailed description and accompanying drawings.

BRIEF DESCRIPTION OF THE DRAWINGS

For a fuller understanding of the nature of some embodiments, reference should be made to the following detailed description taken in conjunction with the accompanying drawings in which.

Like reference numerals refer to like parts throughout the several views of the drawings.

DETAILED DESCRIPTION OF SOME EMBODIMENTS

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and do not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

All references herein to any features or elements of some embodiments such as but not limited to "a," "an," "one," "an additional," "another," or "the" feature or element, or grammatical variations thereof, unless otherwise specified by limiting language such as "ONLY ONE . . . " wherein an exact number is specified along with the world "ONLY" or "LIMITED TO", do NOT specifically prevent the inclusion or implementation of more than one of those features or elements, nor do they specifically admit that one or more of those features or elements must be used, unless otherwise specified by the limiting language "MUST have a" or "NEEDS to include one."

All references herein including language such as but not limited to "one or more," "at least one," or grammatical variants thereof are nonlimiting and may be taken to mean that none of a certain feature or element may be used, or alternatively that only a singular feature or element may be used, or alternatively that only a plurality of elements or features may be used, or alternatively that either a singular or a plurality of features or elements may be used, or alternatively that none or one or more than one features or elements may be used. The use of this terminology herein does NOT specifically admit that more than one feature or element has to be used, nor does it specifically admit that only one feature or element has to be used, unless otherwise specified by the limiting language "MUST BE MORE THAN" or "CANNOT BE MORE THAN." Therefore, whether or not a certain feature or element were limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," or variants thereof do NOT necessarily refer to the same embodiments. For example, language such as "some embodiments include a feature" followed by "some embodiments include an element" does NOT necessarily admit that both of the feature and the element are included in all of the same embodiments.

Unless otherwise specified, one or more particular features and/or elements described in connection with one or more embodiments may be found in one embodiment, or may be found in more than one embodiment, or may be found in all embodiments, or may be found in no embodiments.

Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any and all details set forth herein are used in the context of some embodiments and therefore should NOT be necessarily taken as limiting factors to the attached claims. Any descriptions of elements and/or features and/or the materials used to create those elements or features, or examples or methods included in the descriptions of the various embodiments are nonlimiting and are given as an illustration only. Accordingly, the embodiments can be manufactured, distributed, used, practiced, and carried out in numerous ways.

The attached claims and their legal equivalents can be realized in the context of embodiments other than the ones used as illustrative examples in the description herein.

Referring to the several views of the drawings, the fish recompression tool is shown in accordance with some embodiments. In each of these embodiments, the fish compression tool is generally indicated as 10.

Some embodiments provide a fish recompression tool 10 that can: be attached to a fish by a single fisherman, secure the fish such that it can be returned to deeper water, open automatically at a targeted depth. The tool 10 may have several configurations that allow for the selection of different depths. The tool 10 is reusable and multiple tools 10, each securing a fish, can be returned to the depths simultaneously.

Figure 1:
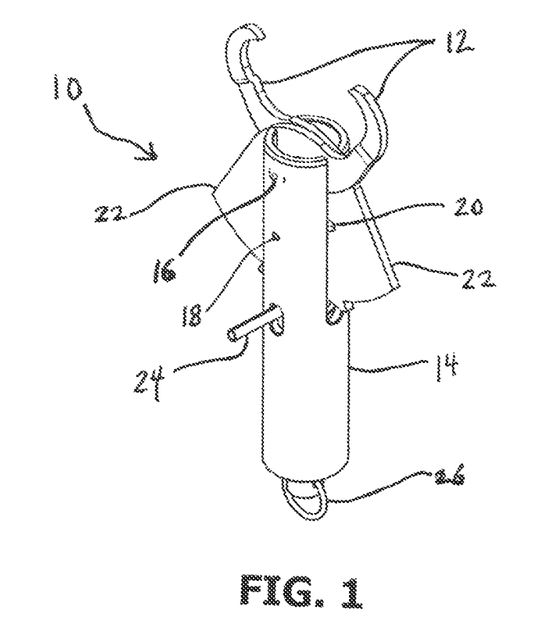
FIG. 1 is a perspective view of the fish recompression device according to an embodiment.
Figure 2:
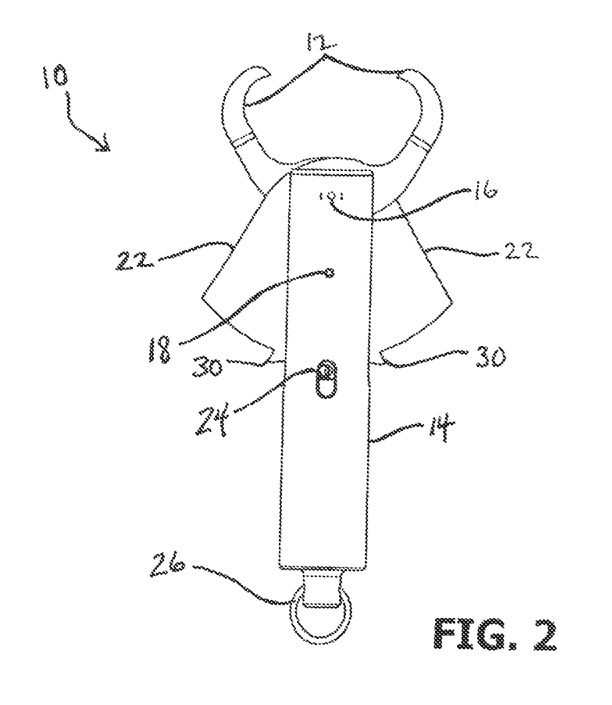
FIG. 2 is a front elevational view of the fish recompression device according to an embodiment.
Figure 3:
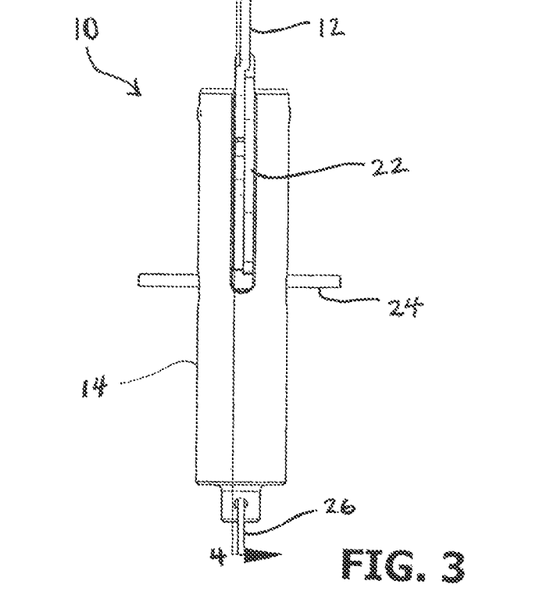
FIG. 3 is a side elevational view of the fish recompression device according to an embodiment.

Reference is now made to FIGS. 1-3. A pair of jaws 12 is pivotally attached to an elongate body 14 using pin 16 and is adapted to clamp onto a fish's lip. Range of motion of the jaws 12 is limited by pin 18 in groove 20. Pin 24 is provided to release the jaws 12 after the tool 10 reaches a particular depth below the water surface. Lever handles 22 are provided for clamping the tool 10 to the fish. A ring or other fastener 26 is provided for tying off the tool 10 to a rope for lowering the fish.

Figure 4:
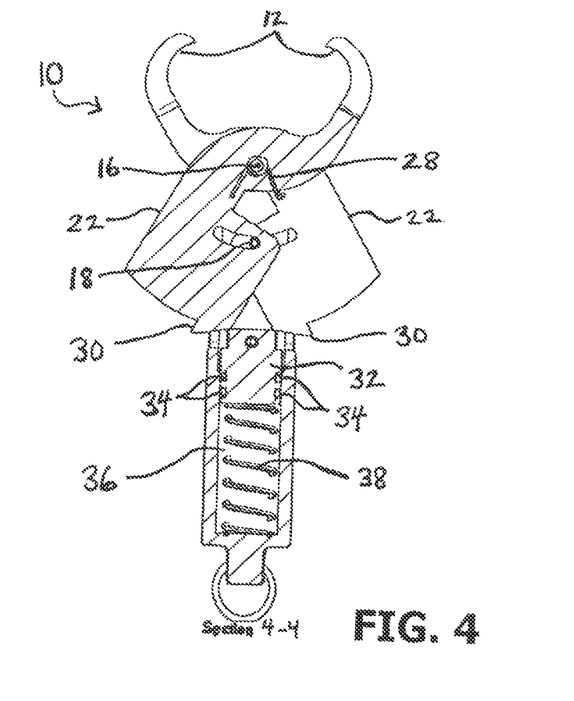
FIG. 4 is a front elevational view of the fish recompression device according to an embodiment shown in cross section along section 4-4 from FIG. 3.
Figure 5:
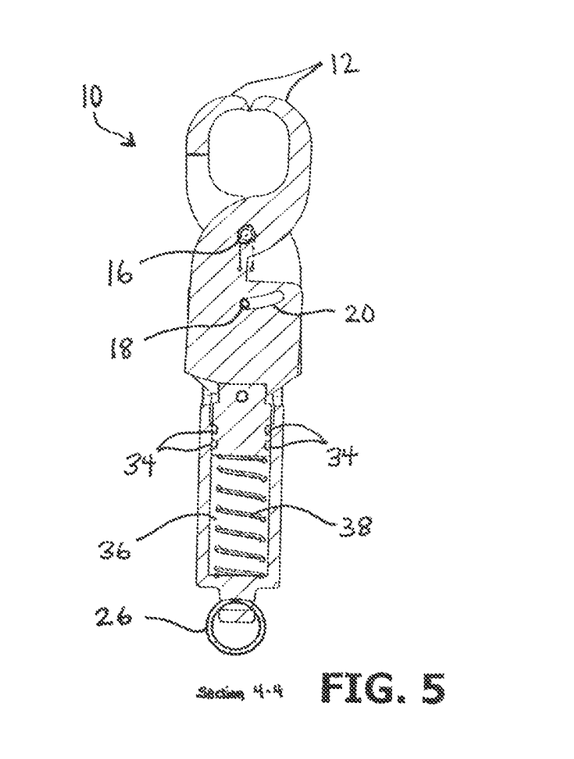
FIG. 5 is a front elevational view of the fish recompression device according to an embodiment shown in cross section along section 4-4 from FIG. 3 wherein the jaws are closed.

Additional reference is now made to FIGS. 4 and 5. In FIG. 4, the jaws 12 are shown open prior to attachment of the tool 10 to a fish. A spring 28 continuously urges the jaws 12 into the open position, which can be countered by squeezing the lever handles 22 with sufficient force to close the jaws 12 (as shown in FIG. 5), thereby locking the jaws 12 on the fish's lip. The jaws 12 are held closed by protrusions 30, or other locking member, until the tool 10 reaches the targeted depth for release of the fish. A piston 32 having seals 34 is located within the elongate body 14 and is in sealed engagement with the inner surface of the elongate body 14 to prevent passage of liquid and gas between an internal airtight chamber 36 and the piston 32. A spring 38 within the airtight chamber 36 serves to pre-load the device 10 by engaging and urging the piston 32 upwards.

In operation, the piston 32 moves downwards within the airtight chamber 36 of the cylinder 14 in response to the external pressure surrounding the airtight chamber 36 being sufficiently greater than the internal pressure within the airtight chamber 36 and the spring force acting on the piston 32. The volume of the chamber 36 decreases as the depth of the tool 10 increases, thereby forcing the piston 32 to travel further downwards into the chamber 36 of the cylinder 14. The resistance of spring 38 to contract determines the external pressure required to move the piston downwards within the chamber 36 and, therefore, at what water depth the jaws 12 open to release the fish. Jaws 12 are initially prevented from moving because the protrusions 30 press against the piston 32 and are unable to bypass the piston 32. As the piston 32 moves downward within the chamber 36, the protrusions 30 are able to clear the piston 32, thereby opening the jaws 12 and releasing the fish. FIG. 4 shows the jaws 12 in the open position with piston 32 forced down by water pressure and moving past protrusions 30 thereby freeing jaws 12.

Figure 6:
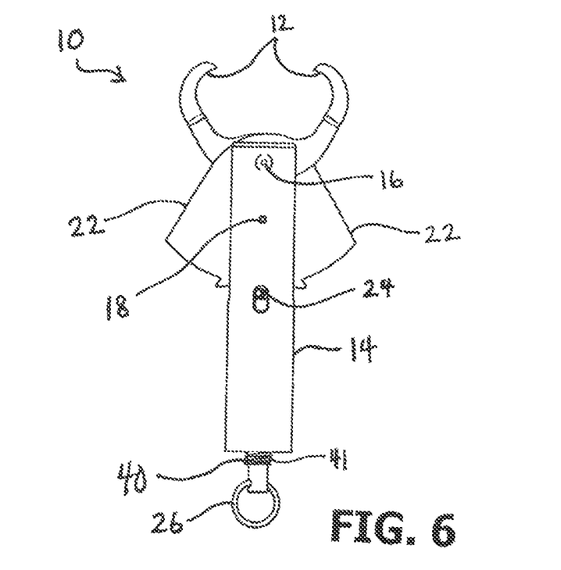
FIG. 6 is a front elevational view of the fish recompression device according to an alternative embodiment.
Figure 7:
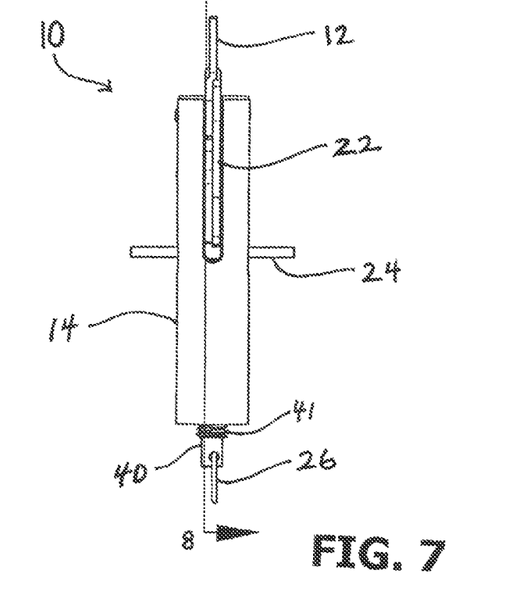
FIG. 7 is a side elevational view of the fish recompression device according to the embodiment of FIG. 6.
Figure 8:
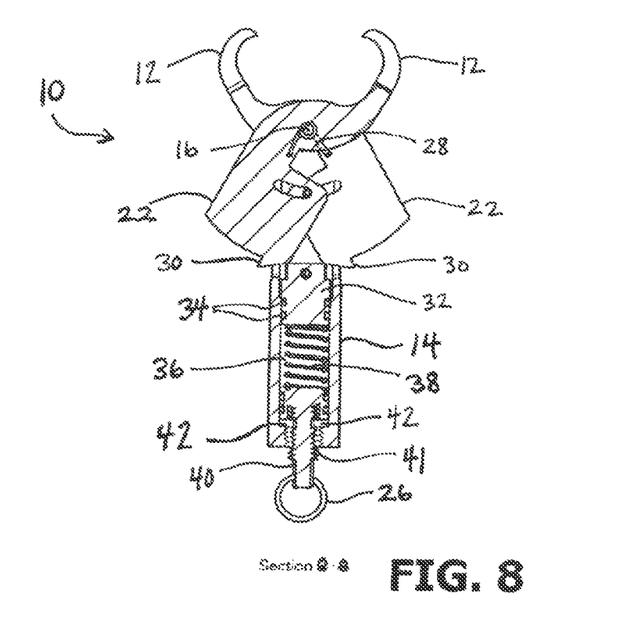
FIG. 8 is a front elevational view of the fish recompression device according to the embodiment of FIG. 6 shown in cross section along section 8-8 from FIG. 7.
Figure 9:
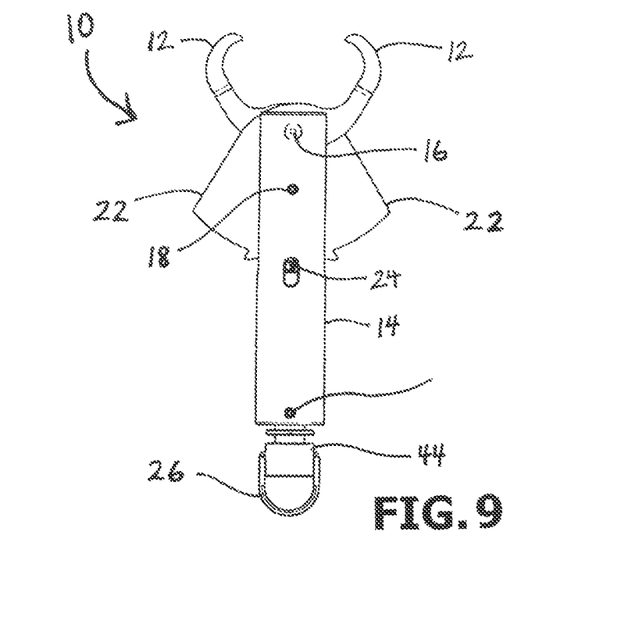
FIG. 9 is a front elevational view of the fish recompression device according to an alternative embodiment.
Figure 10:
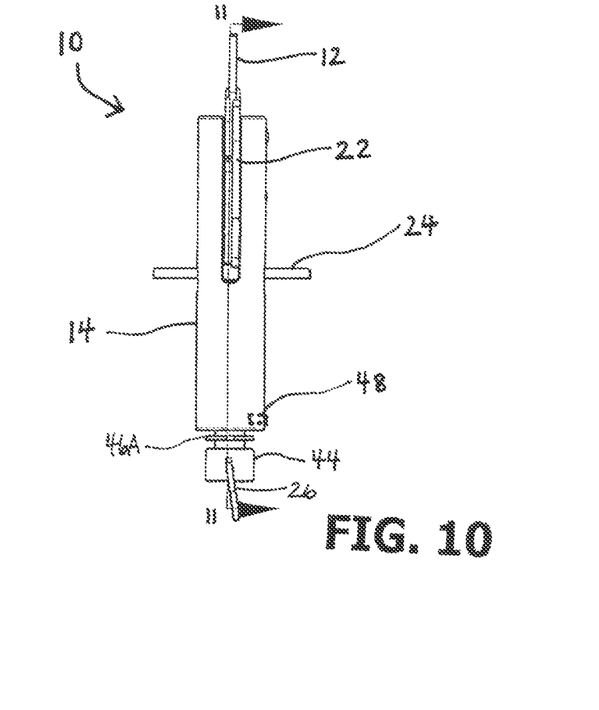
FIG. 10 is a side elevational view of the fish recompression device according to the embodiment of FIG. 9.
Figure 11:
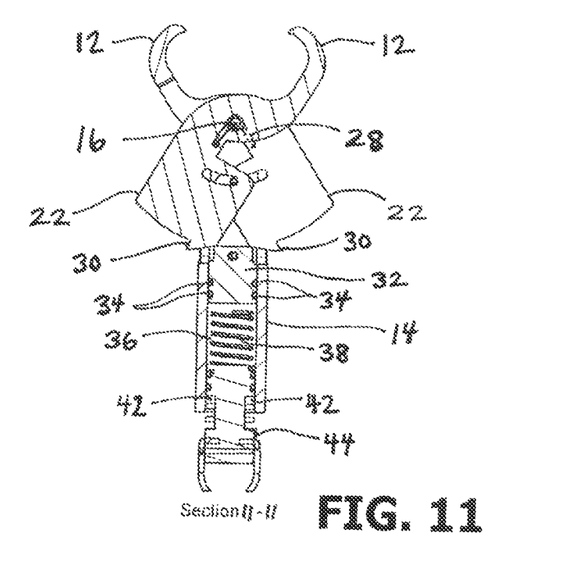
FIG. 11 is a front elevational view of the fish recompression device according to the embodiment of FIG. 9 shown in cross section along section 11-11 from FIG. 10.

FIGS. 6-8 illustrate an alternative embodiment of the fish recompression tool 10 wherein a threaded plug 40 having a threaded shaft 41 secures the bottom of the airtight chamber 36. An O-ring 42 helps to seal the plug 40 within the cylinder 14, thereby preventing the escape and intrusion of fluids into and out of the chamber 36. A pin 18 travels in the groove 20 and limits the travel of the jaws 12 in the open and closed positions. The further the threaded plug 40 is screwed into the chamber 36, thereby increasing the force of the spring 38 against the piston 32, the greater depth the tool 10 must reach before the jaws 12 are opened to release the fish.

Figure 12:
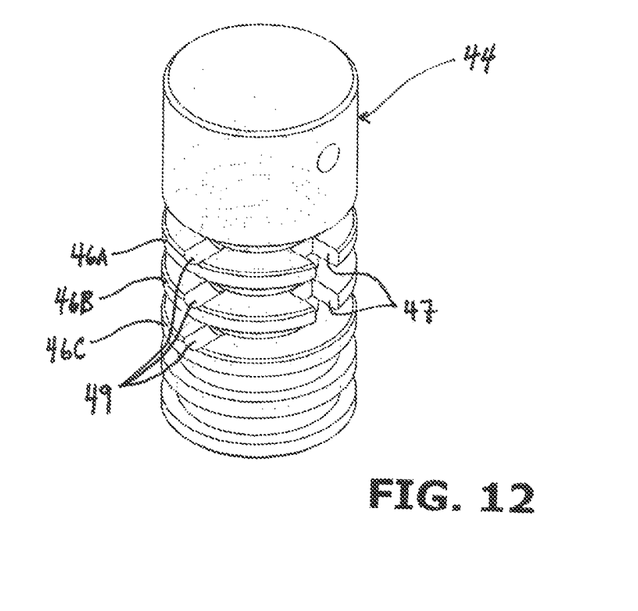
FIG. 12 is a perspective view of the plug used in conjunction with the fish recompression device according to the embodiment of FIG. 9.
Figure 13:
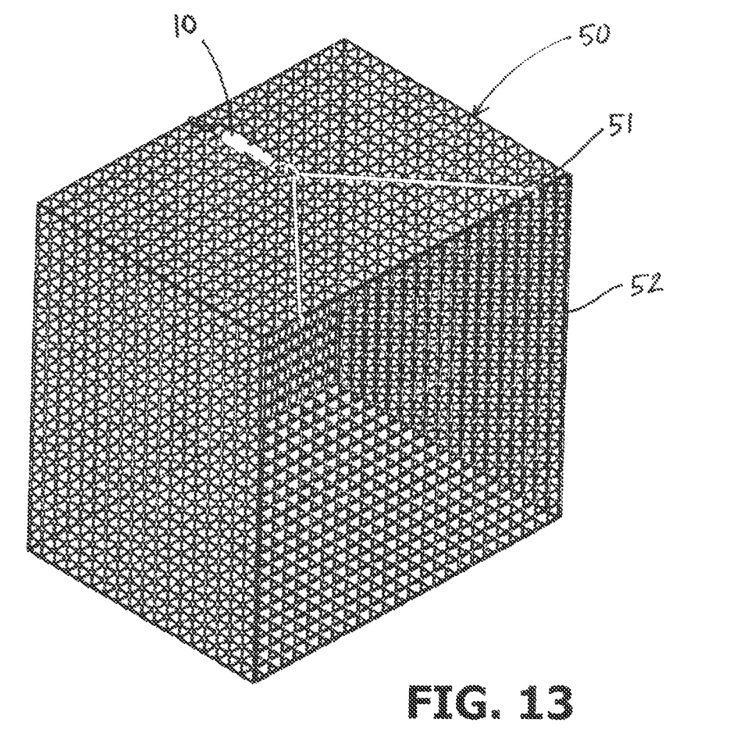
FIG. 13 is a perspective view of the fish recompression device used in conjunction with a cage.
Figure 14:
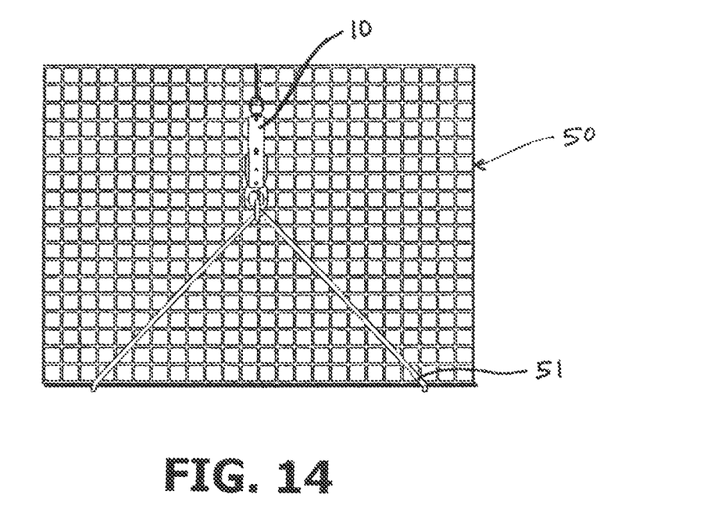
FIG. 14 is a top plan view of the fish recompression device used in conjunction with a cage.
Figure 15:
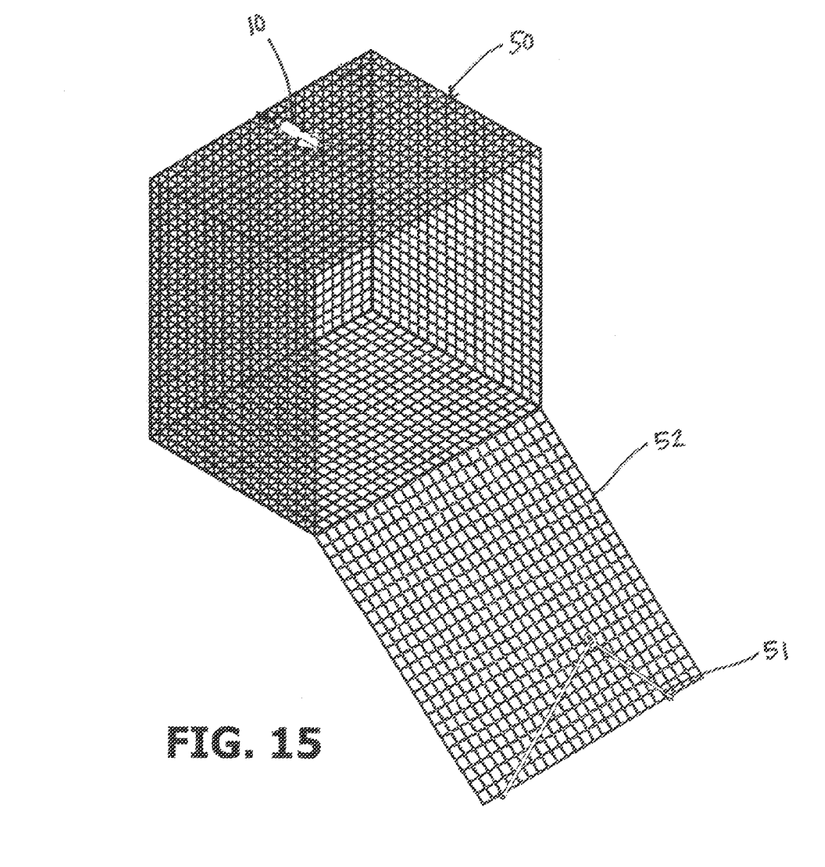
FIG. 15 is a perspective view of the cage when opened.

FIGS. 9-12 illustrate another alternative embodiment of the fish recompression tool 10 wherein a step plug 44 secures the bottom of the chamber 36. The step plug 44 includes a predetermined set of individual target release depths that correspond with dividers 46A, 46B and 46C (as shown in FIG. 12) on the step plug 44. To lock the step plug 44 into the chamber 36, each divider 46A, 46B and 46C includes a notch 47 that is sized to receive setscrew 48 for advancement of the step plug 44 within the chamber 36. When a user has matched up the setscrew 48 with the targeted divider 46A, 46B or 46C, the step plug 44 may be rotated 90 degrees to secure the setscrew 48 into a recess 49, thereby locking the step plug 44 in the chamber 36. O-ring 42 helps to seal the plug 40 within the cylinder 14, thereby preventing the escape and intrusion of fluids into and out of the chamber 36. A pin 18 travels in the groove 20 and limits the travel of the jaws 12 in the open and closed positions. The further the step plug 44 is set in the chamber 36, thereby increasing the force of the spring 38 against the piston 32, the greater depth the tool 10 must reach before the jaws 12 are opened to release the fish. In a preferred embodiment, the target release depths, represented by dividers 46A, 46B and 46C, are 50 feet, 100 feet and 150 feet. While the FIGS. 9-12 illustrate a fish recompression tool 10 and step plug 44 that have three predetermined target release depths, it is considered that a step plug 44 may have more than three dividers 46A, 46B and 46C and, therefore, more than three target release depth options. An FIGS. 13-15 illustrates the fish recompression tool 10 being used in conjunction with cage 50, which allows for securing multiple fish within the cage 50 such that multiple fish can be returned to deeper water at the same time, and open automatically at a targeted depth. As shown in FIGS. 13 and 14, the ring 26 or other fastener is securely attached to the cage 50. A rope 51 is held taut between closed jaws 12 and the cage door 52, keeping the cage door 52 shut. When the tool 10 reaches its target depth, the jaws 12 will open in the manner described above, thereby releasing the rope 51, which allows the cage door 52 to open, as shown in FIG. 15.

Figure 16:
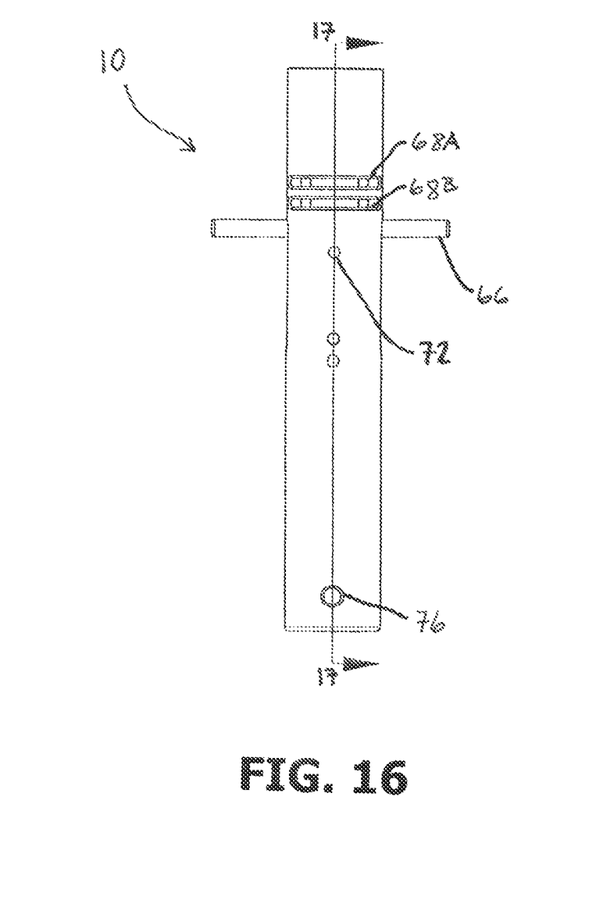
FIG. 16 is a side elevational view of the fish recompression device according to an alternative embodiment.
Figure 17:
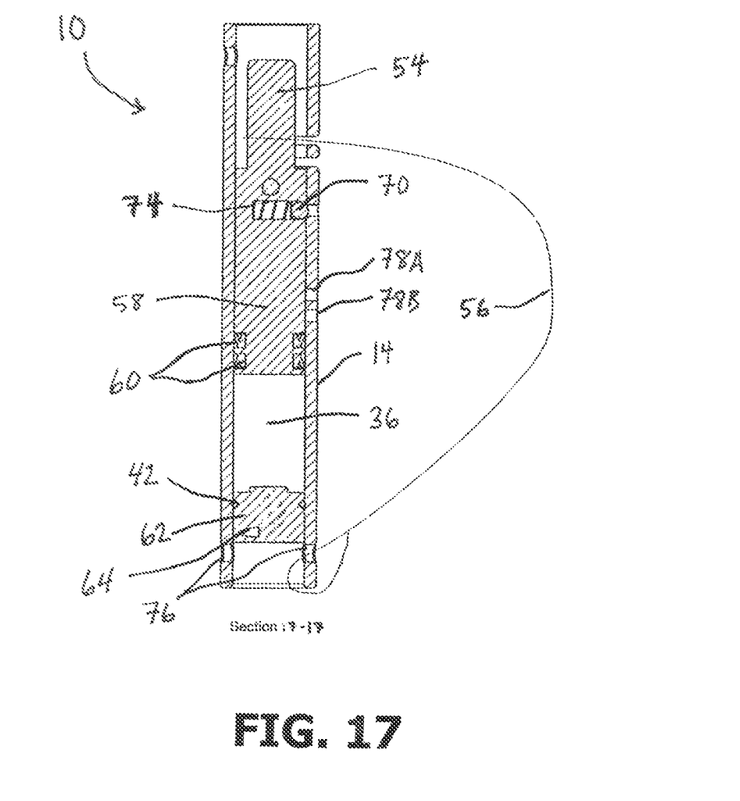
FIG. 17 is a front elevational view of the fish recompression device according to an embodiment shown in cross section along section 17-17 from FIG. 16.

Additional reference is now made to FIGS. 16 and 17. An embodiment of the tool 10 is shown utilizing a pin 54 to release a lanyard 56 that may be threaded through a fish's mouth, lower jaw and/or gills. The pin 54 is attached to piston 58 that travels in cylinder 14 as depth changes. The piston 58 has seals 60 that prevent air from escaping and water from intruding into the airtight chamber 36. A plug 62 secures the bottom of the airtight chamber 36, an O-ring 42 seals the plug 62 to the cylinder 14, thereby preventing fluids from escaping or intruding into the airtight chamber 36. A set screw 64 secures plug 62 to cylinder 14. Applying force to pin 66 lowers the pin 54 and piston 58 against the gas pressure such that the lanyard 56 may be positioned through slot 68A or slot 68B and over the pin 54. Inserting lanyard 56 into slot 68A or 68B will allow the fisherman to select different depths to release the fish with the same device. Ball detent 70 is seated in the hole 72 by spring 74. The ball detent 70 applies a counter force that attempts to hold the piston 58 in its current position, thereby delaying the movement of the piston 58 and the pin 54 until the target depth is reached. The piston 58 travels down inside the cylinder 14 as the depth increases. Pin 54 eventually clears slot 68A or 68B, allowing the lanyard 56 to travel out of the slot 68A or 68B and slip out of the fish's mouth such that the fish may swim away and return to its habitat. Holes 76 allow the attachment of the tool 10 to lanyards 56 or swivels and to subsequent rigging to lower the tool 10 attached to a fish to a desired depth. At depth, the ball 70 is seated in hole 78A or 78B by spring 74 until enough pressure is relieved upon rising toward the surface such that movement of piston 58 is delayed, giving the fish enough time to escape the lanyard 56.

Figure 18:
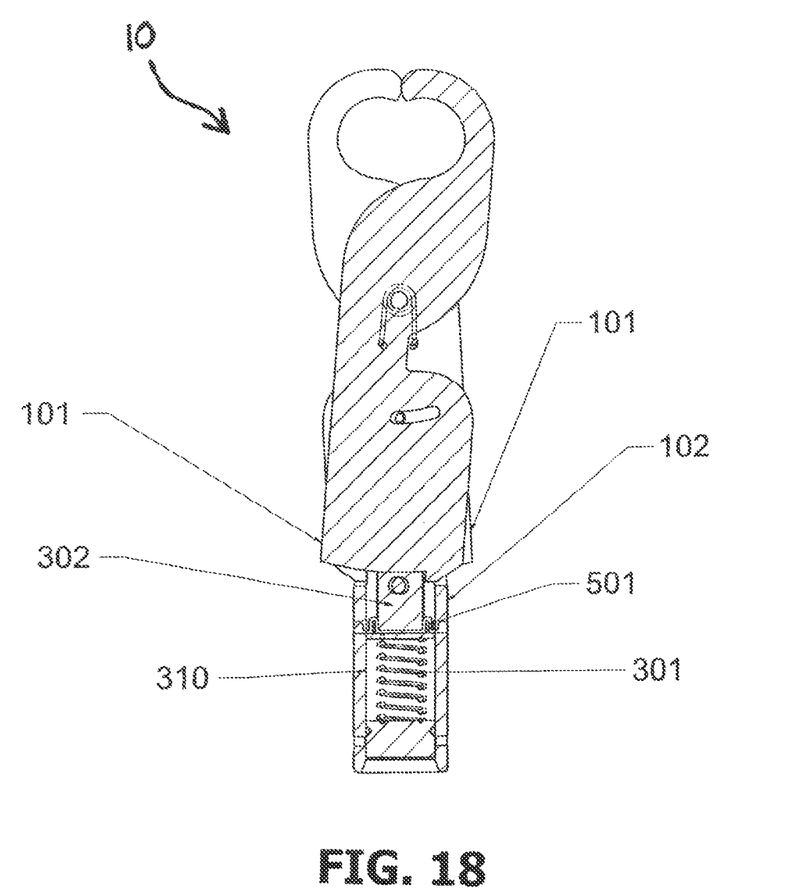
FIG. 18 is a front elevational view of the fish recompression device according to an alternative embodiment shown in cross section.

FIG. 18 shows an alternate construction utilizing a diaphragm 501 as a seal to prevent air from escaping and water from intruding into gas chamber 310. Water pressure at depth forces piston 302 down through cylinder 102 freeing jaws 101 allowing them to open and free the fish. Spring 301 provides minimum force required to move piston 302.

Throughout the detailed description and the accompanying drawings enclosed herein, some embodiments have been shown, described and detailed, wherein a variety of possible elements and/or features may be formed and configured in different ways. Accordingly, any and all possible combinations of the elements and/or features described in accordance with these various embodiments may be desirable to manufacturers and/or may help to more successfully meet customers' specific needs and/or preferences. Consequently, any and all possible combinations of the features or elements of one embodiment or more than one embodiment or all embodiments mentioned herein are fully considered within the spirit and scope of the attached claims and their legal equivalents.

Thus, some embodiments of a fish recompression tool have been disclosed. Other embodiments are contemplated and envisioned, and therefore it is recognized that departures from the embodiments described in this disclosure may certainly exist within the spirit and scope of the attached claims and their legal equivalents. Those having an ordinary skill in the will envision other possible variations and modifications to features and/or elements of the embodiments, and they will envision other possible embodiments, all of which may fall within the spirit and scope of the attached claims. The spirit and scope of the attached claims is therefore NOT limited by the descriptions and illuminations of the embodiments that have already been presented, but rather the spirit and scope can only be defined by the attached claims and their legal equivalents as interpreted under the doctrine of equivalents. Variations, alternatives, adjustments, modifications, tunings, and deviations from the embodiments of the instant disclosure are fully contemplated and envisioned within the spirit and scope of the attached claims.

What is claimed is:

1. A fish recompression tool for releasing a fish below the surface of a body of water, said tool comprising:
    an elongate body having a proximal end, a distal end and an inner surface between said proximal end and said distal end;
    an attachment member on the proximal end of said elongate body, said attachment member being structured and disposed for attaching to the fish, and said attachment member being operable between a closed configuration for attachment to the fish and an open configuration for releasing the fish;
    an airtight chamber within said elongate body and surrounded by said inner surface;
    a piston movably received within said elongate body to define a first end of said airtight chamber, and said piston being disposed in sealed engagement with said inner surface of said elongate body to prevent passage of liquid and gas between said piston and said inner surface, and said piston being movable relative to said proximal and distal ends of said elongate body in response to external forces exerted thereon;
    a spring housed within said airtight chamber, said spring engaging said piston and applying a force on said piston towards said proximal end of said elongate body to urge said piston to a first position; and
    said attachment member being held in the closed configuration when said piston is at the first position and said piston being moveable from the first position in response to the external forces exerted thereon exceeding an internal pressure force within said airtight chamber and the force applied to said piston by said spring to operate said attachment member to the open configuration, thereby releasing the fish.

2. The fish recompression tool as recited in claim 1 further comprising a securing member on the distal end of said elongate body for retrieving said fish recompression tool from below the water surface.

3. The fish recompression tool as recited in claim 1 wherein said attachment member further includes a handle, said handle being structured and disposed for switching said attachment member from the open configuration to the closed configuration.

4. The fish recompression tool as recited in claim 1 wherein said piston includes a seal for preventing passage of liquid and gas between the inner surface of said airtight chamber and said piston.

5. The fish recompression tool as recited in claim 1 wherein the attachment member comprises pivoting jaws that clamp onto the fish.

6. The fish recompression tool as recited in claim 5 wherein each of said pivoting jaws further comprises a protrusion that is held against said piston when said piston is in the first position, wherein said piston moving away from the first position and against the force applied by said spring allows each of said protrusions to move and thereby causes the jaws to operate to the open configuration.

7. A fish recompression tool for releasing a fish below the surface of a body of water, said tool comprising:
    an elongate body having a proximal end, an open distal end and an inner surface between said proximal and distal ends;
    an attachment member on the proximal end of said elongate body, said attachment member being structured and disposed for attaching to the fish, and said attachment member being operable between a closed configuration and an open configuration;
    an airtight chamber within said elongate body and surrounded by said inner surface;
    a piston movably received within said elongate body to define a first end of said airtight chamber, and said piston being disposed in sealed engagement with said inner surface of said elongate body to prevent passage of liquid and gas between said inner surface and said piston, and said piston being movable relative to said proximal and distal ends of said elongate body in response to external pressure forces exerted thereon;
    a spring housed within said airtight chamber, said spring engaging said piston and applying a force on said piston towards said proximal end of said elongate body to urge said piston to a first position;

a locking member operable between a locked position and an unlocked position, the locked position holding said attachment member in the closed configuration with said piston at the first position, and the unlocked position allowing said attachment member to assume the open configuration in response to movement of said piston from the first position and away from the proximal end;

a threaded plug for receipt in said open distal end of said elongate body to define a second end of said airtight chamber, and said threaded plug being sized, structured and configured to produce an airtight seal between said inner surface and said threaded plug, and said threaded plug being movable between a range of positions correlating with movement of the threaded plug relative to the airtight chamber for increasing or decreasing the amount of force applied by said spring on said piston for the purpose of setting a predetermined water depth at which said locking member is released from the locked position to the unlocked position, whereby the tool reaching the predetermined water depth results in an external pressure surrounding said airtight chamber that is sufficiently greater than the internal pressure within said airtight chamber and the spring force on said piston, thereby causing said piston to move away from the first position and against the force applied by said spring and releasing said locking member from the locked position to the unlocked position; and a securing member on said tool for retrieving said tool from below the surface of the body of water.

8. The fish recompression tool as recited in claim 7 wherein said attachment member further includes a handle, said handle being structured and disposed for switching said locking member from the unlocked configuration to the locked configuration.

9. The fish recompression tool as recited in claim 7 wherein said threaded plug further comprises an O-ring seal for preventing passage of liquid and gas between the inner surface of said airtight chamber and said threaded plug.

10. The fish recompression tool as recited in claim 7 wherein said piston includes a seal for preventing passage of liquid and gas between the inner surface of said airtight chamber and said piston.

11. The fish recompression tool as recited in claim 7 wherein the attachment member comprises pivoting jaws that clamp onto the fish.

12. The fish recompression tool as recited in claim 11 wherein each of said pivoting jaws further comprises a protrusion that is held against said piston when said piston is in the first position, wherein said piston moving away from the first position and against the force applied by said spring allows each of said protrusions to move and thereby causes the jaws to operate to the open configuration.

13. A fish recompression tool for releasing a fish below the surface of a body of water, said tool comprising:

an elongate body having a proximal end, an open distal end and an inner surface between said proximal and distal ends;

an attachment member on the proximal end of said elongate body, said attachment member being structured and disposed for attaching to the fish, and said attachment member being operable between a closed configuration and an open configuration;

an airtight chamber within said elongate body and surrounded by said inner surface;

a piston movably received within said elongate body to define a first end of said airtight chamber, and said piston being disposed in sealed engagement with said inner surface of said elongate body to prevent passage of liquid and gas between said inner surface and said piston, and said piston being movable relative to said proximal and distal ends of said elongate body in response to external pressure forces exerted thereon;

a spring housed within said airtight chamber, said spring engaging said piston and applying a force on said piston towards said proximal end of said elongate body to urge said piston to a first position;

a locking member operable between a locked position and an unlocked position, the locked position holding said attachment member in the closed configuration with said piston at the first position, and the unlocked position allowing said attachment member to assume the open configuration in response to movement of said piston from the first position and away from the proximal end;

a plug for receipt in said open distal end of said elongate body to define a second end of said airtight chamber, and said plug being sized, structured and configured to produce an airtight seal between said inner surface and said plug, and said plug being movable between a range of predetermined positions correlating with movement of the plug relative to the airtight chamber for increasing or decreasing the amount of force applied by said spring on said piston for the purpose of setting a predetermined water depth at which said locking member is released from the locked position to the unlocked position, whereby the tool reaching the predetermined water depth results in an external pressure surrounding said airtight chamber that is sufficiently greater than the internal pressure within said airtight chamber and the spring force on said piston, thereby causing said piston to move away from the first position and against the force applied by said spring and releasing said locking member from the locked position to the unlocked position; and a securing member on said tool for retrieving said tool from below the surface of the body of water.

14. The fish recompression tool as recited in claim 13 wherein said attachment member further includes a handle, said handle being structured and disposed for switching said locking member from the unlocked configuration to the locked configuration.

15. The fish recompression tool as recited in claim 13 wherein said plug further comprises an O-ring seal for preventing passage of liquid and gas between the inner surface of said airtight chamber and said plug.

16. The fish recompression tool as recited in claim 13 wherein said piston includes a seal for preventing passage of liquid and gas between the inner surface of said airtight chamber and said piston.

17. The fish recompression tool as recited in claim 13 wherein the attachment member comprises pivoting jaws that clamp onto the fish.

18. The fish recompression tool as recited in claim 17 wherein each of said pivoting jaws further comprises a protrusion that is held against said piston when said piston is in the first position, wherein said piston moving away from the first position and against the force applied by said spring allows each of said protrusions to move and thereby causes the jaws to operate to the open configuration.

* * * * *